(12) United States Patent
Shimizu

(10) Patent No.: US 9,435,276 B2
(45) Date of Patent: Sep. 6, 2016

(54) EXHAUST GAS PURIFICATION SYSTEM FOR AN INTERNAL COMBUSTION ENGINE

(71) Applicant: Hajime Shimizu, Gotenba (JP)

(72) Inventor: Hajime Shimizu, Gotenba (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 11 days.

(21) Appl. No.: 14/425,120

(22) PCT Filed: Sep. 3, 2013

(86) PCT No.: PCT/JP2013/073677
§ 371 (c)(1),
(2) Date: Mar. 2, 2015

(87) PCT Pub. No.: WO2014/034947
PCT Pub. Date: Mar. 6, 2014

(65) Prior Publication Data
US 2015/0240729 A1 Aug. 27, 2015

(30) Foreign Application Priority Data
Sep. 3, 2012 (JP) .................................. 2012-193132

(51) Int. Cl.
*F01N 3/20* (2006.01)
*F02D 41/00* (2006.01)
*F02D 41/02* (2006.01)
*F01N 13/00* (2010.01)
*F01N 9/00* (2006.01)
*F01N 3/023* (2006.01)
*F01N 3/021* (2006.01)
*F02D 41/30* (2006.01)
*F01N 3/10* (2006.01)

(52) U.S. Cl.
CPC ............. *F02D 41/005* (2013.01); *F01N 3/021* (2013.01); *F01N 3/0231* (2013.01); *F01N 3/208* (2013.01); *F01N 9/002* (2013.01); *F01N 13/009* (2014.06); *F02D 41/0055* (2013.01); *F02D 41/029* (2013.01); *F02D 41/0275* (2013.01); *F02D 41/30* (2013.01); *F01N 3/106* (2013.01); *F01N 13/0097* (2014.06); *F01N 2430/085* (2013.01); *F01N 2560/06* (2013.01); *F01N 2560/14* (2013.01); *F01N 2610/02* (2013.01); *F01N 2900/1602* (2013.01); *F02D 2200/0802* (2013.01); *F02D 2200/0812* (2013.01); *F02D 2250/36* (2013.01); *Y02T 10/24* (2013.01); *Y02T 10/47* (2013.01)

(58) Field of Classification Search
CPC ................... F02M 2025/0762; F01N 3/0231; F01N 2900/1606; F02D 41/025; F02D 41/0255; F02D 41/029; F02D 41/0055; F02D 41/1467; F02D 2200/0812; F02D 2250/36
See application file for complete search history.

(56) References Cited

U.S. PATENT DOCUMENTS

| | | | |
|---|---|---|---|
| 2002/0170287 A1 | 11/2002 | Hirota et al. | |
| 2004/0093866 A1 | 5/2004 | Ishikawa | |
| 2004/0231324 A1 | 11/2004 | Hirota et al. | |
| 2005/0086933 A1 | 4/2005 | Nieuwstadt et al. | |
| 2008/0276604 A1* | 11/2008 | Hosaka ................ | F01N 3/0231 60/295 |
| 2012/0060477 A1* | 3/2012 | Alm ....................... | F01N 3/023 60/274 |

FOREIGN PATENT DOCUMENTS

| | | |
|---|---|---|
| JP | 2002-106326 | 4/2002 |
| JP | 2004-162674 | 6/2004 |
| JP | 2005-133721 | 5/2005 |
| JP | 2007-2668 | 1/2007 |
| JP | 2010-7518 | 1/2010 |
| JP | 2012-47081 | 3/2012 |

* cited by examiner

Primary Examiner — Jonathan Matthias
(74) Attorney, Agent, or Firm — Finnegan, Henderson, Farabow, Garrett & Dunner, LLP

(57) ABSTRACT

In an exhaust gas purification system for an internal combustion engine provided with a particulate filter and an SCR catalyst arranged downstream of the particulate filter, the present invention is intended to decrease an amount of NOx discharged into the atmosphere in a suitable manner. According to the present invention, in an exhaust gas purification system for an internal combustion engine provided with a particulate filter, an SCR catalyst arranged downstream of the particulate filter, a reducing agent supply device and an EGR device, when the temperature of the particulate filter is equal to or higher than a PM oxidation starting temperature, and when an amount of PM trapped in the particulate filter is equal to or less than an upper limit amount, an amount of EGR gas is made to increase, whereas when the temperature of the particulate filter belongs to a temperature range in which oxidation reduction reaction of $NO_2$ and PM is promoted, and when the temperature of the SCR catalyst belongs to an NOx reduction window, an amount of $NO_2$ in exhaust gas is made to increase.

9 Claims, 9 Drawing Sheets

EXHAUST GAS PURIFICATION SYSTEM FOR AN INTERNAL COMBUSTION ENGINE

CROSS-REFERENCE TO RELATED APPLICATIONS

This application is a national phase application of International Application No. PCT/JP2013/073677, filed Sep. 3, 2013, and claims the priority of Japanese Application No. 2012-193132, filed Sep. 3, 2012, the content of both of which is incorporated herein by reference.

TECHNICAL FIELD

The present invention relates to an exhaust gas purification system for an internal combustion engine, and in particular, to an exhaust gas purification system provided with a particulate filter and a selective catalytic reduction (SCR: Selective Catalytic Reduction) catalyst which are arranged in an exhaust passage of the internal combustion engine.

BACKGROUND ART

In the past, there has been known an exhaust gas purification system which is provided with a particulate filter arranged in an exhaust passage of an internal combustion engine, an SCR catalyst arranged in a portion of the exhaust passage at the downstream side of the particulate filter, a reducing agent supply means to add a reducing agent into an exhaust gas flowing into the SCR catalyst, and an EGR mechanism to recirculate a part of the exhaust gas from the exhaust passage to an intake passage. In such an exhaust gas purification system, there has been proposed a technology in which when the temperature of the particulate filter is made to go up for the purpose of oxidation of particulate matter (PM: Particulate Matter) trapped in the particulate filter, the amount of recirculation of EGR gas is made to decrease (see, for example, a first patent literature).

In an exhaust gas purification apparatus which is provided with a particulate filter arranged in an exhaust passage of an internal combustion engine, and an EGR device to recirculate a part (EGR gas) of exhaust gas from the exhaust passage to an intake passage, there has also been proposed a technology in which when the internal combustion engine is in a medium load operating state, the amount of NOx discharged or emitted from the internal combustion engine is decreased by increasing the amount of EGR gas (see, for example, a second patent literature).

In an exhaust gas purification apparatus which is provided with a particulate filter arranged in an exhaust passage of an internal combustion engine, and an EGR device to recirculate a part (EGR gas) of exhaust gas from the exhaust passage to an intake passage, there has also been proposed a technology in which when the temperature of the particulate filter is high and when the concentration of oxygen in the exhaust gas is high, the amount of exhaust gas passing through the particulate filter is decreased by carrying out the processing to increase the amount of EGR gas, etc. (see, for example, a third patent literature).

In an exhaust gas purification apparatus which is provided with an NOx catalyst arranged in an exhaust passage of an internal combustion engine, and an EGR device to recirculate a part (EGR gas) of exhaust gas from the exhaust passage to an intake passage, there has also been proposed a technology in which when the temperature of the NOx catalyst is higher than an active region, an EGR ratio is made large, thereby attaining a decrease in the temperature of the exhaust gas (see, for example, a fourth patent literature).

In an exhaust gas purification apparatus which is provided with a particulate filter arranged in an exhaust passage of an internal combustion engine, a first EGR device to recirculate a part (EGR gas) of exhaust gas from a portion of the exhaust passage at the upstream side of a turbine to a portion of the exhaust passage at the downstream side of a compressor, and a second EGR device to recirculate a part (EGR gas) of exhaust gas from a portion of the exhaust passage at the downstream side of the turbine to a portion of the exhaust passage at the upstream side of the compressor, there has also been proposed a technology in which when the temperature of the exhaust gas is higher than the regeneration temperature of the particulate filter, the EGR gas is recirculated by the use of the second EGR device (see, for example, a fifth patent literature).

In an exhaust gas purification apparatus which is provided with a particulate filter arranged in an exhaust passage of an internal combustion engine, and an NOx catalyst arranged in a portion of the exhaust passage at the downstream side of the particulate filter, there has also been proposed a technology in which regeneration of the particulate filter and denitration of NOx are carried out by adjusting the concentration of oxygen in the exhaust gas (see, for example, a sixth patent literature).

PRIOR ART REFERENCES

Patent Literatures

First Patent Literature: Japanese patent laid-open publication No. 2012-047081
Second Patent Literature: Japanese patent laid-open publication No. 2007-002668
Third Patent Literature: Japanese patent laid-open publication No. 2002-106326
Fourth Patent Literature: Japanese patent laid-open publication No. 2010-007518
Fifth Patent Literature: Japanese patent laid-open publication No. 2004-162674
Sixth Patent Literature: Japanese patent laid-open publication No. 2005-133721

SUMMARY OF THE INVENTION

Problems to be Solved by the Invention

However, in an exhaust gas purification system provided with a particulate filter and an SCR catalyst, when the amount of EGR gas is decreased, the amount of NOx discharged from an internal combustion engine will increase, so that the amount of NOx to be discharged into the atmosphere without being removed (or reduced) by means of the SCR catalyst may increase.

In particular, in cases where the temperature of the SCR catalyst is higher than an upper limit value (about 400 degrees C.) of an NOx reduction window, the amount of a reducing agent (e.g., ammonia ($NH_3$)) to be adsorbed to the SCR catalyst becomes small, so that the amount of NOx to be discharged into the atmosphere without being removed (or reduced) by the SCR catalyst tends to increase easily.

The present invention has been made in view of the above-mentioned actual circumstances, and the main object of the invention is to provide a technology in which the amount of NOx to be discharged into the atmosphere can be decreased in a suitable manner, in an exhaust gas purification system provided with a particulate filter and an SCR catalyst.

Means for Solving the Problems

In order to solve the above-mentioned problems, the present invention resides in an exhaust gas purification system for an internal combustion engine which is provided with; a particulate filter that is arranged in an exhaust passage of the internal combustion engine; a selective catalytic reduction catalyst that is arranged in a portion of the exhaust passage at the downstream side of the particulate filter; a reducing agent supply device that supplies a reducing agent, which is ammonia or a precursor of ammonia, to a portion of the exhaust passage at the upstream side of the selective catalytic reduction catalyst; and an EGR mechanism that supplies a part of exhaust gas from the exhaust passage to an intake passage of the internal combustion engine as an EGR gas; wherein when the temperature of the particulate filter is equal to or higher than the lowest temperature at which particulate matter (PM) can be oxidized, and when the amount of PM trapped in the particulate filter is small, the amount of the EGR gas is made to increase, whereas when the temperature of the particulate filter belongs to a temperature range which is lower than the lowest temperature at which particulate matter can be oxidized, and when the temperature of the selective catalytic reduction catalyst falls within an NOx reduction window, the amount of NOx contained in the exhaust gas is made to increase.

Specifically, an exhaust gas purification system for an internal combustion engine according to the present invention is provided with:

a particulate filter that is arranged in an exhaust passage of the internal combustion engine;

a selective catalytic reduction catalyst that is arranged in a portion of the exhaust passage at the downstream side of said particulate filter;

a reducing agent supply device that supplies a reducing agent, which is ammonia or a precursor of ammonia, to a portion of the exhaust passage at the upstream side of said selective catalytic reduction catalyst; and an EGR device that supplies a part of exhaust gas flowing through the exhaust passage to an intake passage as an EGR gas;

a first temperature detection means that detects a temperature which is correlated with the temperature of said particulate filter;

a second temperature detection means that detects a temperature which is correlated with the temperature of said selective catalytic reduction catalyst;

a detection means that detects an amount of trapped PM which is an amount of PM trapped in said particulate filter; and a control means that controls the EGR device so as to increase the amount of EGR gas, when a detected value of said first temperature detection means is equal to or higher than the lowest temperature at which particulate matter can be oxidized, and when the amount of trapped PM detected by said detection means is smaller by a predetermined amount or more, with respect to a threshold value of the amount of trapped PM which becomes an execution condition of PM regeneration processing, and carries out NOx increasing processing which is processing to increase NOx discharged from the internal combustion engine, when the detected value of said first temperature detection means belongs to a temperature range which is lower than the lowest temperature at which particulate matter can be oxidized, and in which an oxidation reduction reaction between the particulate matter trapped in the particulate filter and nitrogen dioxide which is a part of NOx contained in the exhaust gas is promoted, and when a detected value of the second temperature detection means belongs to said NOx reduction window.

The expression "the lowest temperature at which particulate matter can be oxidized" referred to herein is a temperature lower than a target temperature (e.g., from 500 degrees C. to 600 degrees C.) of the particulate filter at the time when PM regeneration processing is carried out which is processing to oxidize and remove the particulate matter (PM) trapped in the particulate filter, and is a temperature (e.g., 450 degrees C.) at which a part of the PM trapped by the particulate filter begins to be oxidized. The expression "to increase the amount of EGR gas" is processing to make the amount of EGR gas larger, in comparison with the time when the temperature of the particulate filter is less than the lowest temperature at which the PM can be oxidized. The expression "a temperature range in which an oxidation reduction reaction between the particulate matter trapped in the particulate filter and nitrogen dioxide contained in the exhaust gas is promoted" is a temperature range (e.g., a temperature range around 350 degrees C.) which is lower than "the lowest temperature at which particulate matter can be oxidized". The expression "the NOx reduction window" is a temperature range in which the rate of NOx reduction (i.e., the ratio of the amount of NOx reduced by the SCR catalyst with respect to the amount of NOx flowing into the SCR catalyst) of the selective catalytic reduction catalyst (hereinafter referred to as "the SCR catalyst") becomes equal to or higher than the lowest rate of NOx reduction which has been determined in advance, and has been obtained experimentally in advance.

The reducing agent (ammonia ($NH_3$)) supplied from the reducing agent supply device is adsorbed to the SCR catalyst. The ammonia ($NH_3$) adsorbed to the SCR catalyst reacts with the NOx in the exhaust gas, so that it is converted into $N_2$, $H_2O$, etc. However, when the amount of NOx flowing into the SCR catalyst becomes large, there will be a possibility that the amount of NOx to be discharged into the atmosphere without being reduced in the SCR catalyst may also become large. In addition, when the amount of NOx flowing into the SCR catalyst becomes large, there will also be a possibility that the amount of the reducing agent consumed for the reduction of NOx in the SCR catalyst may become large. Accordingly, it is desirable that the amount of NOx flowing into the SCR catalyst be made as small as possible.

On the other hand, there can be considered a method to decrease the amount of NOx generated when a mixture is combusted or burned (i.e., the amount of NOx discharged from the internal combustion engine), by retarding the combustion timing of the mixture to be combusted in a cylinder of the internal combustion engine. Specifically, there can be considered a method of retarding fuel injection timing in an internal combustion engine of compression ignition type, or a method of retarding ignition timing in an internal combustion engine of spark ignition type. In cases where the combustion timing of the mixture is retarded, the combustion temperature of the mixture becomes lower, in comparison with the case where the combustion timing of the mixture is not retarded. As a result, the amount of NOx generated at the time of combustion of the mixture (i.e., the amount of NOx discharged from the internal combustion engine) decreases. The decrease in the amount of NOx discharged from the internal combustion engine will also decrease the amount of NOx flowing into the SCR catalyst.

However, when fuel injection timing or ignition timing is retarded, the amount of heat energy, which contributes to the output power of the internal combustion engine among the heat energy generated at the time of combustion of the mixture, will become smaller. For that reason, in order to make the generation torque of the internal combustion engine equal to the torque required by a driver, it is necessary to increase the amount of fuel injection, thus giving rise to a possibility that the amount of fuel consumption and the amount of generation of carbon dioxide ($CO_2$) are increased.

Accordingly, in the exhaust gas purification system for an internal combustion engine of the present invention, when the temperature of the particulate filter is equal to or higher than the lowest temperature at which the PM can be oxidized (hereinafter, referred to as a "PM oxidation starting temperature"), the amount of EGR gas is made to increase. When the amount of EGR gas is increased, the combustion temperature of the mixture becomes low, so that the amount of NOx discharged from the internal combustion engine is decreased. As a result, it is possible to decrease the amount of NOx discharged from the internal combustion engine, while suppressing the amount of retardation of the fuel injection timing or the ignition timing to a small level. Accordingly, it is possible to decrease the amount of NOx flowing into the SCR catalyst, while suppressing an increase in the amount of fuel consumption or in the amount of generation of $CO_2$.

Here, note that when the amount of EGR gas is increased, there will be a possibility that the amount of PM generated at the time of combustion of the mixture (the amount of PM discharged from the internal combustion engine) increases. However, the PM discharged from the internal combustion engine is trapped by the particulate filter, thus making it possible to avoid the situation that the amount of PM discharged into the atmosphere increases.

However, when the amount of PM discharged from the internal combustion engine increases, it becomes easy for the amount of trapped PM in the particulate filter to increase, so the frequency of execution of the processing for oxidizing and removing the PM trapped in the particulate filter (the PM regeneration processing) may become high. When the frequency of execution of the PM regeneration processing becomes high, it will also be concerned that the amount of fuel consumption may increase.

On the other hand, the processing to increase the amount of the EGR gas in the present invention is carried out when the temperature of the particulate filter is equal to or higher than the PM oxidation starting temperature, thus making it possible to avoid the situation that the amount of trapped PM in the particulate filter increases to a large extent. As a result, it is possible to suppress an increase in the amounts of NOx and PM which are discharged into the atmosphere, while avoiding the situation that the frequency of execution of the PM regeneration processing becomes high.

However, when the amount of EGR gas is increased during the time the amount of trapped PM in the particulate filter is large, the amount of trapped PM in the particulate filter may become large to an excessive extent, or the amount of PM oxidized in the particulate filter may become large to an excessive extent. As a result, a rise of back pressure may be induced due to an increase in the pressure loss of the particulate filter, or an excessive rise in the temperature of the particulate filter may be induced due to an increase in the amount of oxidation of PM (the rate of oxidation of PM).

On the other hand, the control means of the present invention increases the amount of EGR gas on condition that the amount of trapped PM detected by the detection means is smaller, by a predetermined amount or more, than the threshold value of the amount of trapped PM (hereinafter referred to as a "PM regeneration threshold value") which is used as the execution condition of the PM regeneration processing. According to such a method, it becomes possible to avoid the situation that the amount of trapped PM in the particulate filter may become excessively large, or the amount of PM oxidized in the particulate filter may become excessively large. As a result, it becomes possible to suppress the rise of back pressure which may otherwise be induced due to an increase in the pressure loss of the particulate filter, or the excessive rise in the temperature of the particulate filter which may otherwise be induced due to an increase in the amount of oxidation of PM (the rate of oxidation of PM). The "predetermined amount" referred to herein is an amount at which even in cases where the amount of PM flowing into the particulate filter is increased due to the increase in the amount of EGR gas, it is considered to be able to avoid the rise of back pressure or the excessive rise in the temperature of the particulate filter, and is an amount which can be obtained in advance by adaptation processing making use of experiments, etc.

On the other hand, when the detected value of the first temperature detection means belongs to the temperature range in which the oxidation reduction reaction between the PM trapped in the particulate filter and nitrogen dioxide ($NO_2$), which is a part of NOx, is promoted, and when the detected value of the second temperature detection means belongs to the NOx reduction window, the control means of the present invention carries out NOx increasing processing, which is processing to increase the NOx discharged from the internal combustion engine.

Even in cases where the temperature of the particulate filter is lower than the PM oxidation starting temperature, when the temperature of the particulate filter belongs to a specific temperature range (e.g., a temperature range around 350 degrees C.), the oxidation reduction reaction of the PM trapped in the particulate filter and $NO_2$ in the exhaust gas is promoted (activated).

Accordingly, when the detected value of the first temperature detection means belongs to a temperature range (hereinafter referred to as an "$NO_2$ reduction window") in which the oxidation reduction reaction between the PM trapped in the particulate filter and $NO_2$ in the exhaust gas is promoted, and when the detected value of the second temperature detection means belongs to the NOx reduction window, the execution of the NOx increasing processing will also increase the amount of $NO_2$ in accordance with the increasing amount of the NOx contained in the exhaust gas. As the amount of the $NO_2$ contained in the exhaust gas increases, the amount of PM oxidized by the $NO_2$ in the exhaust gas among the PM trapped in the particulate filter is increased. As a result, the amount of trapped PM in the particulate filter is decreased.

When the amount of trapped PM in the particulate filter is decreased according to the above-mentioned method, the probability (frequency) that the amount of trapped PM at the time the detected value of the first temperature detection means has risen up to and above the PM oxidation starting temperature will become smaller than the PM regeneration threshold value becomes high. As a result, the probability (frequency) that the processing to increase the amount of EGR gas will be carried out when the detected value of the first temperature detection means has risen up to or above the PM oxidation starting temperature also becomes high.

Here, it is considered that in cases where the NOx increasing processing is carried out, the amount of NOx flowing into the SCR catalyst becomes larger, in comparison with the case where the NOx increasing processing is not carried out. However, $NO_2$, a part of NOx, reacts with PM and is reduced. In addition, the temperature of the SCR catalyst belongs to the NOx reduction window, and so the remaining NOx (e.g., nitric oxide (NO)) is reduced by the SCR catalyst. Accordingly, in cases where the NOx increasing processing is carried out, an increase in the amount of NOx to be discharged into the atmosphere is suppressed.

Here, as a method for carrying out the NOx increasing processing, there can be used a method of decreasing the amount of EGR gas. As other methods for carrying out the NOx increasing processing, there can be used a method of advancing fuel injection timing in an internal combustion engine of compression ignition type, a method of advancing ignition timing in an internal combustion engine of spark ignition type, or the like. In addition, the method of decreasing the amount of EGR gas, and the method of advancing fuel injection timing or ignition timing may be used together.

In the exhaust gas purification system for an internal combustion engine of the present invention, the control means may carry out processing to increase the amount of EGR gas, when the temperature of the SCR catalyst exceeds an upper limit value of the NOx reduction window. Specifically, in the case where the detected value of the second temperature detection means is higher than the upper limit value of the NOx reduction window, the control means may control the EGR device so as to increase the amount of EGR gas, if the detected value of the first temperature detection means is equal to or higher than the PM oxidation starting temperature, and at the same time, if the amount of trapped PM is smaller, by a predetermined amount or more, in comparison with the regeneration threshold value.

The expression "the upper limit value of the NOx reduction window" referred to herein can be considered to be the lowest temperature at which an amount of ammonia ($NH_3$) to be required at the time of reducing the NOx in the exhaust gas becomes unable to be adsorbed by the SCR catalyst.

In cases where the high load operation of the internal combustion engine is continued, there will be a possibility that the temperature of the SCR catalyst becomes higher than the upper limit value of the NOx reduction window. When the temperature of the SCR catalyst is higher than said upper limit value, the amount of $NH_3$, which is adsorbed to the SCR catalyst, decreases, so that the rate of NOx reduction of the SCR catalyst becomes low. As a result, the amount of NOx to be discharged into the atmosphere may become large, without being removed or reduced by means of the SCR catalyst.

On the other hand, in the case where the temperature of the SCR catalyst is higher than the upper limit value of the NOx reduction window, when the amount of EGR gas is increased on condition that the detected value of the first temperature detection means is equal to or higher than the PM oxidation starting temperature, and that the amount of trapped PM is smaller by the predetermined amount or more with respect to the regeneration threshold value, it is possible to suppress the amount of NOx discharged into the atmosphere to a small level.

In the exhaust gas purification system for an internal combustion engine of the present invention, the control means may carry out processing to decrease the amount of reducing agent to be supplied from said reducing agent supply device, in a period of time in which the detected value of the second temperature detection means exceeds the upper limit value of the NOx reduction window.

A period of time in which the temperature of the SCR catalyst becomes higher than the upper limit value of the NOx reduction window, the amount of $NH_3$, which can be adsorbed by the SCR catalyst, becomes small. For that reason, in the case where the temperature of the SCR catalyst is higher than said upper limit value, when an amount of reducing agent equal to that at the time the temperature of the SCR catalyst is lower than said upper limit value (i.e., when it belongs to the NOx reduction window) is supplied from the reducing agent supply device, $NH_3$, which is not adsorbed to the SCR catalyst, may increase.

On the other hand, when the amount of the reducing agent supplied from the reducing agent supply device is decreased in the period of time in which the detected value of the second temperature detection means exceeds the upper limit value of the NOx reduction window, it is possible to make small the amount of ammonia ($NH_3$) (the amount of $NH_3$ slip) which is not adsorbed by the SCR catalyst, as well as to suppress unnecessary consumption of $NH_3$. Here, it is also assumed that when the amount of the reducing agent supplied from the reducing agent supply device is decreased, the rate of NOx reduction in the SCR catalyst drops or becomes low. However, the amount of NOx discharged from the internal combustion engine is made small by the increase in the amount of EGR gas, thus making it possible to suppress the increase in the amount of NOx to be discharged into the atmosphere without being reduced by the SCR catalyst. Accordingly, it is also possible to suppress the increase in the amount of $NH_3$ slip, while suppressing the increase in the amount of NOx to be discharged into the atmosphere.

Here, note that the timing to start decreasing the amount of the reducing agent supplied from the reducing agent supply device does not need to be simultaneous with the timing at which the increase in the amount of EGR gas is started, but may be earlier than the timing at which the increase in the amount of EGR gas is started. In other words, before the temperature of the SCR catalyst exceeds the upper limit value of the NOx reduction window, the decrease in the amount of the reducing agent may be started. When the decrease in the amount of the reducing agent is started before the temperature of the SCR catalyst exceeds said upper limit value, it is possible to suppress small the amount of $NH_3$ desorbing from the SCR catalyst at the time when the temperature of the SCR catalyst exceeds said upper limit value.

In cases where the decrease in the amount of the reducing agent is started before the temperature of the SCR catalyst exceeds said upper limit value, the decrease in the amount of the reducing agent may be started, for example, at the time when the detected value of the second temperature detection means reaches a predetermined temperature which is lower than said upper limit value, on condition that the detected value of the first temperature detection means tends to rise. The "predetermined temperature" referred to herein is the lowest temperature from which the temperature of the SCR catalyst is considered to rise up to a temperature higher than said upper limit value in accordance with the rise in temperature of the particulate filter, and can have been obtained in advance by adaptation processing making use of experiments, etc.

Effect of the Invention

According to the present invention, in an exhaust gas purification system for an internal combustion engine provided with a particulate filter and an SCR catalyst, the amount of NOx to be discharged into the atmosphere can be decreased in a suitable manner.

MODES FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

<Embodiment 1>

Figure 1:
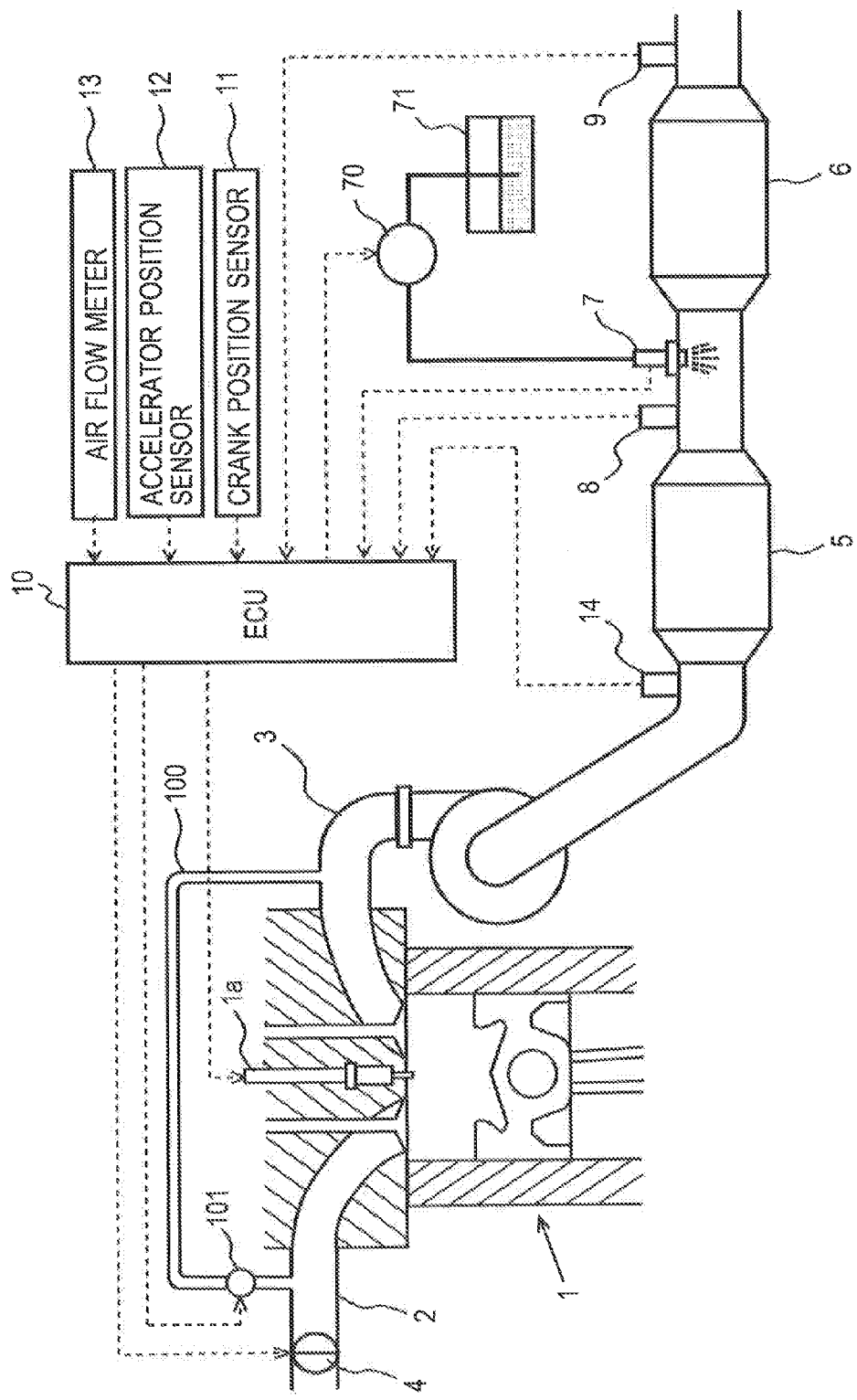
FIG. 1 is a view showing the schematic construction of an internal combustion engine with its intake and exhaust systems to which the present invention is applied.

First, reference will be made to a first embodiment of the present invention based on FIGS. 1 through 7. FIG. 1 is a view showing the schematic construction of an internal combustion engine and its intake and exhaust systems to which the present invention is applied. The internal combustion engine 1 shown in FIG. 1 is a compression ignition type internal combustion engine (diesel engine) having a plurality of cylinders. Here, note that the internal combustion engine to which the present invention is applied is not limited to internal combustion engines of compression ignition type, but may be internal combustion engines of spark ignition type (gasoline engines) in which a lean burn operation is carried out.

The internal combustion engine 1 is provided with fuel injection valves 1a for injecting fuel into corresponding cylinders, respectively. In addition, an intake passage 2 and an exhaust passage 3 are connected to the internal combustion engine 1. The intake passage 2 is a passage for guiding fresh air (hereinafter simply air) taken in from the atmosphere to each cylinder of the internal combustion engine 1. The exhaust passage 3 is a passage for circulating or passing a burned gas (an exhaust gas) discharged from the interior of each cylinder of the internal combustion engine 1.

A intake air throttle valve (hereinafter simply a throttle valve) 4 is arranged in the middle of the intake passage 2. The throttle valve 4 is a valve mechanism which serves to adjust an amount of air to be sucked into each cylinder of the internal combustion engine 1 by changing the channel cross section of the intake passage 2. Here, note that the throttle valve 4 is provided with a valve body and an electric motor for driving to open and close the valve body, wherein the electric motor is controlled by an ECU 10 which will be described later.

A first catalyst casing 5 and a second catalyst casing 6 are arranged in series with each other in the middle of the exhaust passage 3 in this order from an upstream side thereof. The first catalyst casing 5 has therein an oxidation catalyst and a particulate filter which are received in a cylindrical casing. At that time, the oxidation catalyst may be supported by a catalyst carrier which is arranged at the upstream side of the particulate filter, or may be supported by the particulate filter.

In addition, the second catalyst casing 6 receives therein a catalyst carrier by which a selective catalytic reduction (SCR) catalyst is supported in a cylindrical casing. The catalyst carrier is formed by coating an alumina-based or zeolite-based active component (carrier) on a substrate of monolithic type having a honeycomb-shaped cross section which is made, for example, of cordierite, Fe—Cr—Al heat resisting steel, etc. Moreover, a noble metal catalyst having oxidation ability (e.g., platinum (Pt), palladium (Pd), etc.) is supported by the catalyst carrier.

Here, note that in the interior of the second catalyst casing 6, at the downstream side of the SCR catalyst, there may be arranged a catalyst carrier that supports thereon an oxidation catalyst. The oxidation catalyst in that case is to oxidize, among a reducing agent supplied to the SCR catalyst from a reducing agent addition valve 7 to be described later, a part of the reducing agent having passed or slipped through the SCR catalyst.

The reducing agent addition valve 7 for adding (injecting) the reducing agent, which is $NH_3$ or a precursor of $NH_3$, into the exhaust gas is mounted on the exhaust passage 3 at a location between the first catalyst casing 5 and the second catalyst casing 6. The reducing agent addition valve 7 is a valve mechanism having a nozzle hole which is opened and closed by the movement of a needle. The reducing agent addition valve 7 is connected to a reducing agent tank 71 through a pump 70. The pump 70 draws the reducing agent stored in the reducing agent tank 71, and at the same time, pressure feeds the reducing agent thus drawn to the reducing agent addition valve 7. The reducing agent addition valve 7 injects the reducing agent pressure fed from the pump 70 into the exhaust passage 3. Here, note that the reducing agent addition valve 7 and the pump 70 are merely one form of the reducing agent supply device according to the present invention.

Here, as the reducing agent stored in the reducing agent tank 71, there can be used a water solution such as urea, ammonium carbamate, etc., or ammonia ($NH_3$) gas. In this embodiment, reference will be made to an example in which an aqueous urea solution is used as the reducing agent.

When the aqueous urea solution is injected from the reducing agent addition valve 7, the aqueous urea solution flows into the second catalyst casing 6 together with the exhaust gas. At that time, the aqueous urea solution is pyrolyzed or hydrolyzed by receiving the heat of the exhaust gas or the second catalyst casing 6. When the aqueous urea solution is pyrolyzed or hydrolyzed, ammonia ($NH_3$) is generated. The ammonia ($NH_3$) generated in this manner is adsorbed (or occluded) to the SCR catalyst. The ammonia ($NH_3$) adsorbed or occluded to the SCR catalyst reacts with the nitrogen oxides (NOx) contained in the exhaust gas to generate nitrogen ($N_2$) and water ($H_2O$). In other words, $NH_3$ functions as a reducing agent for NOx.

Moreover, the internal combustion engine 1 is provided with an exhaust gas recirculation (EGR) device which includes an EGR passage 100 through which the intake passage 2 and the exhaust passage 3 are placed in communication with each other, and an EGR valve 101 which changes the channel cross section of the EGR passage 100. The EGR passage 100 is a passage which serves to guide a part of the exhaust gas flowing through the exhaust passage 3 to a portion of the intake passage 2 at the downstream side of the throttle valve 4 as an EGR gas. The EGR valve 101 is a valve mechanism which serves to adjust the amount of EGR gas supplied to the intake passage 2 from the exhaust passage 3, by changing the channel cross section of the EGR passage 100. Here, note that the EGR valve 101 is provided with a valve body and an electric motor for driving to open and close the valve body, wherein the electric motor is controlled by the ECU 10 to be described later.

The ECU 10 is provided in combination with the internal combustion engine 1 as constructed in this manner. The ECU 10 is an electronic control unit which is provided with a CPU, a ROM, a RAM, a backup RAM, and so on. The ECU 10 is electrically connected to a variety of kinds of sensors such as a first exhaust gas temperature sensor 8, a second exhaust gas temperature sensor 9, a crank position sensor 11, an accelerator position sensor 12, an air flow meter 13, an air fuel ratio (A/F) sensor 14, and so on.

The first exhaust gas temperature sensor 8 is arranged in the exhaust passage 3 at a location downstream of the first catalyst casing 5 and upstream of the second catalyst casing 6, and outputs an electrical signal correlated with the temperature of the exhaust gas flowing out from the first catalyst casing 5, in other words, the temperature of the particulate filter received in the first catalyst casing 5. The second exhaust gas temperature sensor 9 is arranged in the exhaust passage 3 at a location downstream of the second catalyst casing 6, and outputs an electric signal correlated with the temperature of the exhaust gas flowing out from the second catalyst casing 6, in other words, the temperature of the SCR catalyst received in the second catalyst casing 6. Here, note that the first exhaust gas temperature sensor 8 corresponds to a first temperature detection means according to the present invention, and the second exhaust gas temperature sensor 9 corresponds to a second temperature detection means according to the present invention.

The crank position sensor 11 outputs an electric signal correlated with the rotational position of an output shaft (crankshaft) of the internal combustion engine 1. The accelerator position sensor 12 outputs an electric signal correlated with the amount of operation of an accelerator pedal (i.e., the degree of opening of an accelerator). The air flow meter 13 outputs an electric signal correlated with the amount of air (i.e., the amount of intake air) sucked into the internal combustion engine 1. The A/F sensor 14 is arranged in the exhaust passage 3 at a location upstream of the first catalyst casing 5, and outputs an electric signal correlated with the air fuel ratio of the exhaust gas.

The ECU 10 is electrically connected to the various kinds of equipment such as the fuel injection valves 1*a*, the throttle valve 4, the reducing agent addition valve 7, the pump 70, the EGR valve 101, and so on. The ECU 10 controls the above-mentioned variety of kinds of equipment in an electrical manner based on the output signals of the above-mentioned variety of kinds of sensors. For example, in addition to known control operations such as the fuel injection control of the internal combustion engine 1, the addition control to cause the reducing agent to be injected intermittently from the reducing agent addition valve 7, etc., the ECU 10 carries out the NOx decreasing processing in which the amount of NOx discharged from the internal combustion engine 1 is made to decrease when the rate of NOx reduction of the SCR catalyst received in the second catalyst casing 6 becomes low. In the following, a method of carrying out the NOx decreasing processing in this embodiment will be described.

Figure 2:
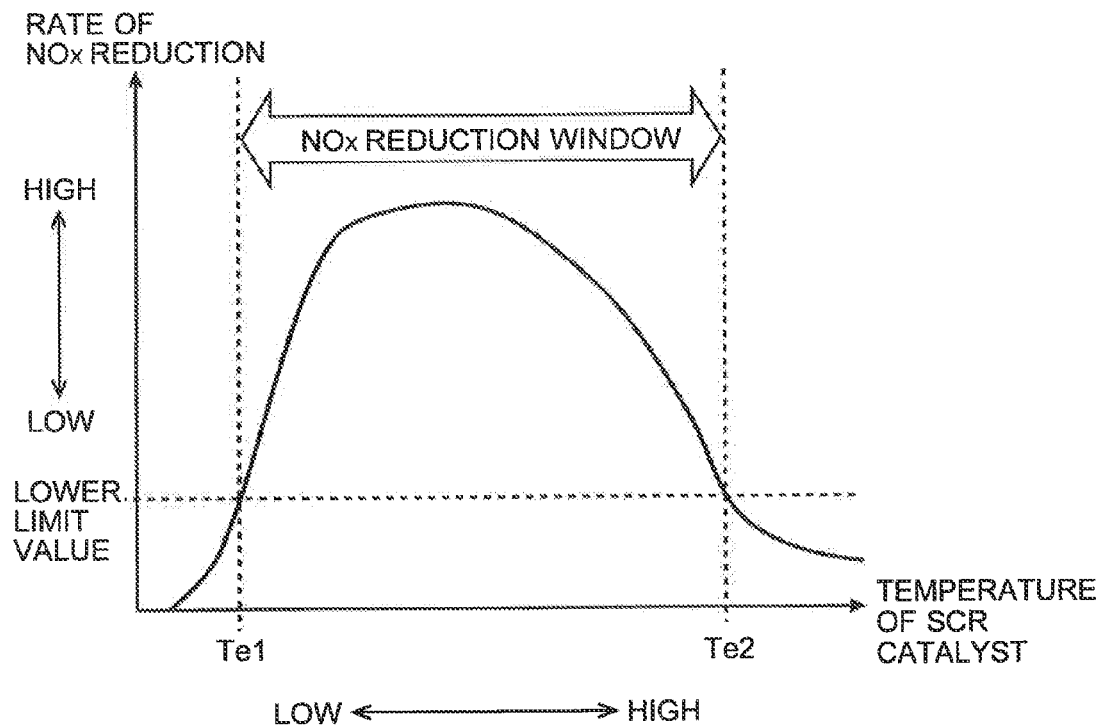
FIG. 2 is a view showing the relation between the temperature of an SCR catalyst and the rate of NOx reduction thereof.

First, a temperature range in which NOx removal or reduction ability of the SCR catalyst is activated (NOx reduction window) will be described based on FIG. 2. An axis of abscissa in FIG. 2 represents the temperature of the SCR catalyst, and an axis of ordinate represents the rate of NOx reduction of the SCR catalyst (the ratio of the amount of NOx reduced by the SCR catalyst with respect to the amount of NOx flowing into the SCR catalyst). When the temperature of the SCR catalyst is lower than a first temperature Te1, the reduction ability of the SCR catalyst becomes low, so that the rate of NOx reduction becomes lower than a lower limit value which has been set in advance. On the other hand, when the temperature of the SCR catalyst becomes higher than a second temperature Te2 which is higher than the first temperature Te1 the amount of $NH_3$, which can be adsorbed by the SCR catalyst, becomes smaller, so that the rate of NOx reduction becomes lower than the lower limit value. Accordingly, the SCR catalyst exhibits NOx reduction ability which is effective in a temperature range (NOx reduction window) from the first temperature Te1 to the second temperature Te2. Here, note that the second temperature Te2 changes with the amount of support, the capacity, and so on, of the SCR catalyst, but it is about 400 degrees C.

However, in cases where the high load operation state of the internal combustion engine 1 is continued, there will be a possibility that the temperature of the SCR catalyst becomes higher than the second temperature Te2. When the temperature of the SCR catalyst becomes higher than the second temperature Te2, the amount of NOx to be discharged into the atmosphere without being removed (or reduced) by means of the SCR catalyst may become large.

On the other hand, there can be considered a method for retarding the combustion timing of a mixture which is combusted in each cylinder of the internal combustion engine, when the temperature of the SCR catalyst is higher than the upper limit value of the NOx reduction temperature window (i.e., the second temperature Te2). In cases where the fuel injection timing of the fuel injection valves 1*a* is retarded, the combustion temperature of the mixture becomes lower, in comparison with the case where the fuel injection timing of the fuel injection valves 1*a* is not retarded. As a result, the amount of NOx generated at the time of combustion of the mixture (i.e., the amount of NOx discharged from the internal combustion engine 1) decreases. However, when the fuel injection timing is retarded, a decrease in the engine output power will be caused, and hence, it is necessary to increase the amount of fuel injection, thus giving rise to a possibility that the amount of fuel consumption and the amount of generation of carbon dioxide ($CO_2$) may increase.

Accordingly, in the NOx decreasing processing of this embodiment, in cases where the temperature of the SCR catalyst is higher than the upper limit value (the second temperature Te2) of the NOx reduction window, when the temperature of the particulate filter is equal to or higher than the lowest temperature (PM oxidation starting temperature) at which PM can be oxidized, the ECU 10 controls such that the amount of EGR gas is made to increase.

When the amount of EGR gas is large, the combustion temperature of the mixture becomes lower in comparison with it is small, and hence, the amount of NOx to be generated decreases. As a result, the amount of retardation of the fuel injection timing can be made small. Accordingly, it is possible to decrease the amount of NOx discharged from the internal combustion engine, while suppressing an increase in the amount of fuel consumption or in the amount of generation of $CO_2$. That is, when the temperature of the SCR catalyst is higher than the upper limit value (the second temperature Te2) of the NOx reduction window, it is possible to suppress an increase in the amount of NOx to be discharged into the atmosphere, while suppressing an increase in the amount of fuel consumption or in the amount of generation of $CO_2$.

Figure 3:
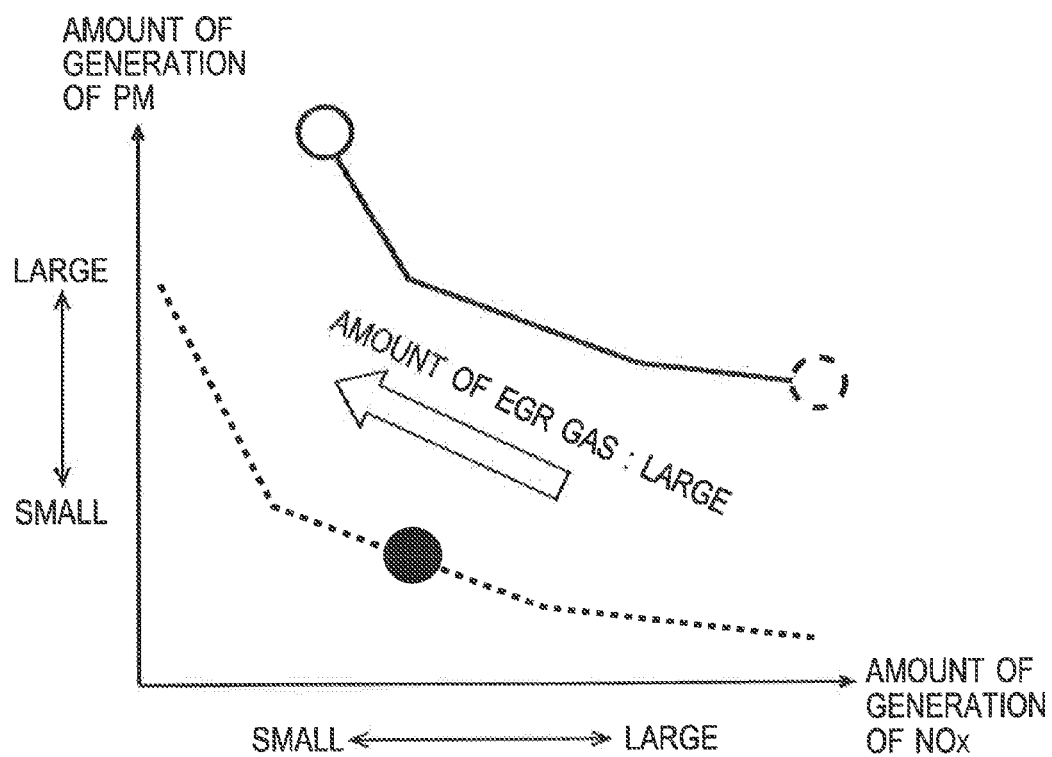
FIG. 3 is a view showing the relation among fuel injection timing, the amount of EGR gas, the amount of generation of NOx and the amount of generation of PM.

FIG. 3 is a view showing the relation among the fuel injection timing, the amount of EGR gas, the amount of generation of NOx (the amount of NOx discharged from the internal combustion engine 1), and the amount of generation of PM (the amount of PM discharged from the internal combustion engine 1). A solid line in FIG. 3 indicates the relation between the amount of generation of PM and the amount of generation of NOx at the time of changing the amount of EGR gas, in cases where the amount of retardation of fuel injection timing is small (e.g., in an amount of retardation when the temperature of the SCR catalyst falls in the NOx reduction window). On the other hand, a broken line in FIG. 3 indicates the relation between the amount of generation of PM and the amount of generation of NOx at the time of changing the amount of EGR gas, in cases where the amount of retardation of fuel injection timing is large. Here, note that in the solid line and the broken line in FIG. 3, it is assumed that the amount of EGR gas increases as it goes to the left side of this figure.

In FIG. 3, when the temperature of the SCR catalyst is within the NOx reduction window, the amount of retardation of fuel injection timing is made small, and the amount of EGR gas is made small, as shown in a broken-line white circle on the solid line. In addition, when the temperature of the SCR catalyst is higher than the upper limit value (the second temperature Te2) of the NOx reduction window, and when the fuel injection timing is retarded as shown in a black circle on the broken line, it is also possible to suppress the increase in the amount of generation of NOx to a small level, while making small the increase in the amount of generation of PM. On the other hand, when the amount of EGR gas is increased, while suppressing small the amount of retardation of the fuel injection timing, as shown in a solid-line white circle on the solid line, the amount of generation of PM becomes large, though the amount of generation of NOx can be suppressed small.

Figure 4:
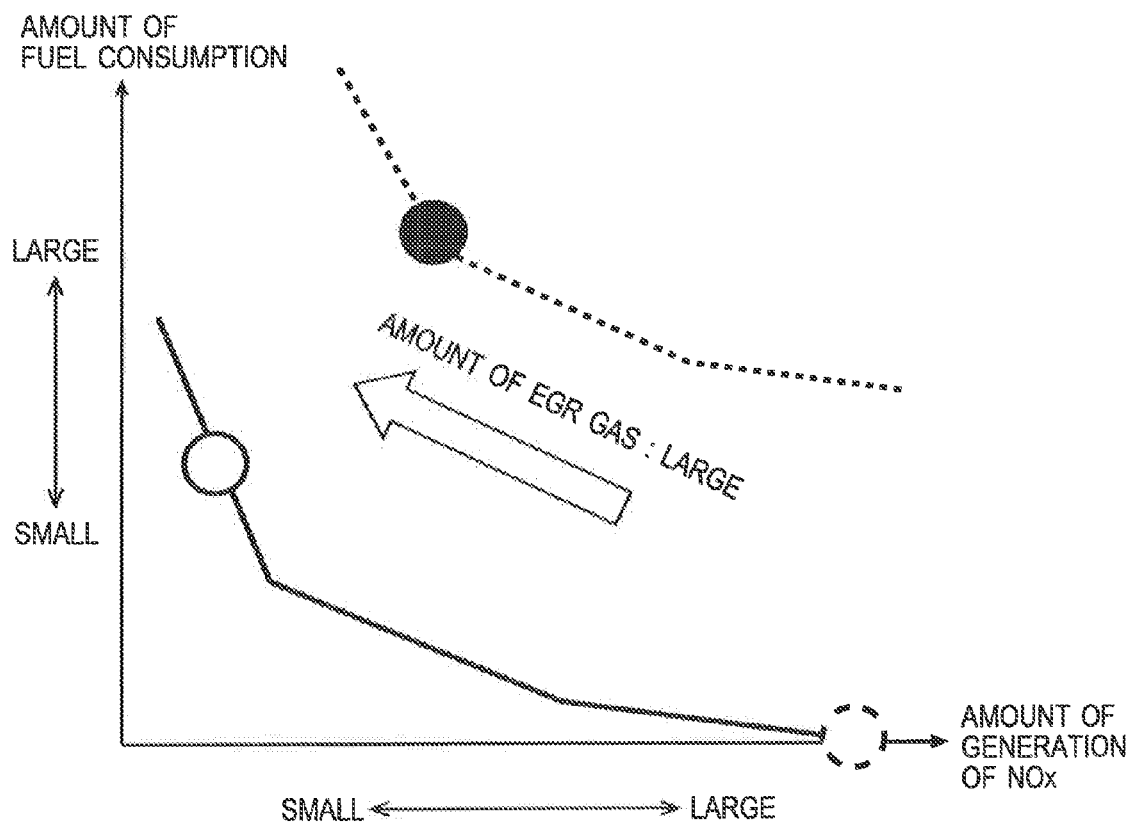
FIG. 4 is a view showing the relation among fuel injection timing, the amount of EGR gas, the amount of generation of NOx, and the amount of fuel consumption.

Next, the relation among the fuel injection timing, the amount of EGR gas, the amount of generation of NOx, and the amount of fuel consumption is shown in FIG. 4. A solid line in FIG. 4 indicates the relation between the amount of fuel consumption and the amount of generation of NOx at the time of changing the amount of EGR gas, in cases where the amount of retardation of fuel injection timing is small.

On the other hand, a broken line in FIG. 4 indicates the relation between the amount of fuel consumption and the amount of generation of NOx at the time of changing the amount of EGR gas, in cases where the amount of retardation of fuel injection timing is large. Here, note that the fuel injection timing and the amount of EGR gas in each of a broken-line white circle, a solid-line white circle, and a solid-line black circle in FIG. 4 are equivalent to the broken-line white circle, the solid-line white circle, and the solid-line black circle in FIG. 3 as mentioned above.

In FIG. 4, in cases where the internal combustion engine 1 is operated at the fuel injection timing and in the amount of EGR gas as shown in the solid-line black circle on the broken line, the amount of fuel consumption becomes worse, in comparison with the case where the internal combustion engine 1 is operated at the fuel injection timing and in the amount of EGR gas as shown in the solid-line white circle on the solid line.

Here, when the temperature of the particulate filter is higher than the PM oxidation starting temperature, and when the fuel injection timing and the amount of EGR gas shown in the solid-line white circle in FIG. 3 and FIG. 4 are selected, an increase in the amount of PM discharged from the internal combustion engine 1 can be offset by the amount of PM oxidized in the particulate filter. In other words, an increase in the amount of trapped PM in the particulate filter accompanying the increase in the amount of generation of PM can be suppressed as small as possible. Accordingly, it becomes possible to make small the amount of generation of NOx and the amount of fuel consumption, while suppressing an increase in the frequency of execution of the PM regeneration processing.

Figure 5:
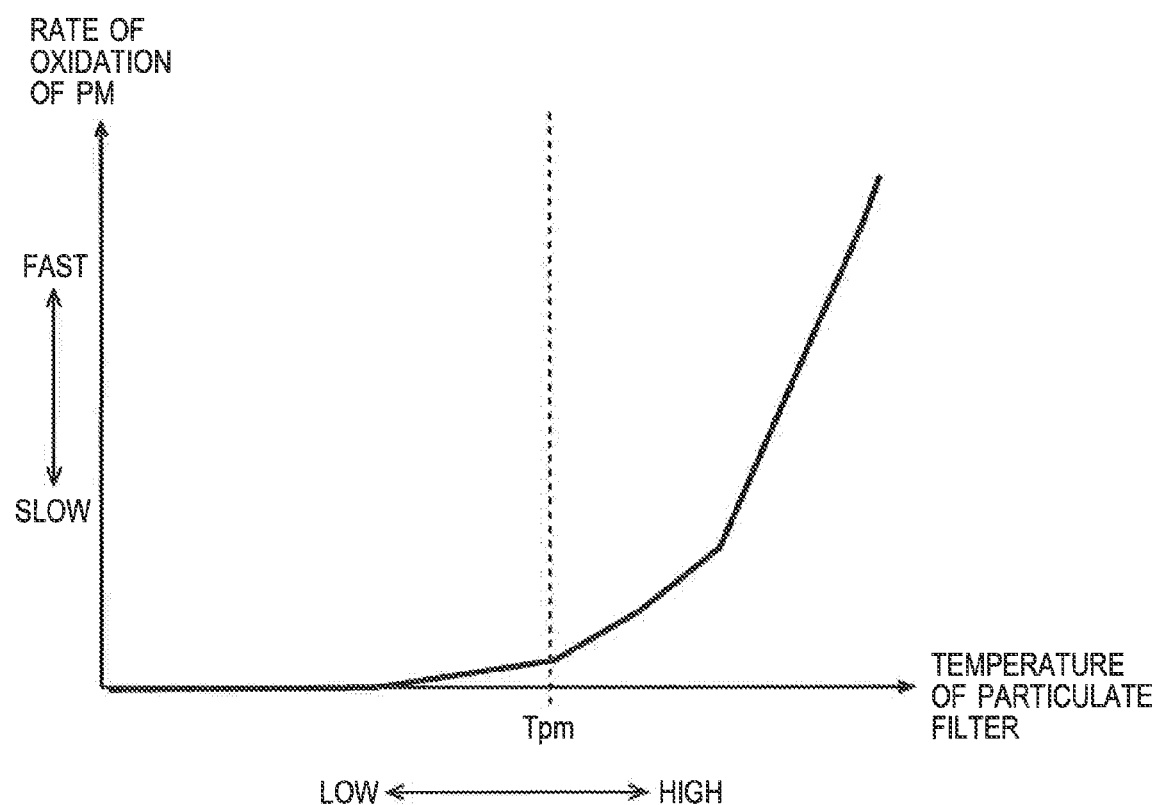
FIG. 5 is a view showing the relation between the temperature of a particulate filter and the rate of oxidation of PM.

Here, note that the amount of PM to be oxidized per unit time (the rate of oxidation of PM) in the particulate filter begins to increase at the time when the temperature of the particulate filter is equal to or above a predetermined temperature (PM oxidation starting temperature) Tpm, as shown in FIG. 5. Accordingly, in cases where the temperature of the SCR catalyst is higher than the second temperature Te2, and where the temperature of the particulate filter is equal to or higher than the above-mentioned PM oxidation starting temperature Tpm, when the above-mentioned NOx decreasing processing (i.e., processing in which the amount of EGR gas is made to increase, while suppressing the retardation of the fuel injection timing) is carried out, it is possible to suppress an increase in the amount of NOx to be discharged into the atmosphere, while suppressing the increase in the amount of fuel consumption (the increase in the amount of generation of $CO_2$), the increase in the frequency of execution of the PM regeneration processing, and the increase in the amount of PM to be discharged into the atmosphere. Although the above-mentioned PM oxidation starting temperature Tpm changes with the material of the particulate filter, the capacity of the particulate filter, etc., it is about 450 degrees C.

However, when the amount of trapped PM in the particulate filter is equal to or larger than a PM regeneration threshold value, or is close to the PM regeneration threshold value, and when the NOx decreasing processing due to the increase in the amount of EGR gas is carried out, the amount of trapped PM in the particulate filter may become large to an excessive extent, or the amount of PM oxidized in the particulate filter may become large to an excessive extent. As a result, a rise of back pressure may be induced due to an increase in the pressure loss of the particulate filter, or an excessive rise in the temperature of the particulate filter may be induced due to an increase in the amount of oxidation of PM (the rate of oxidation of PM).

On the other hand, when the NOx decreasing processing due to the increase in the amount of EGR gas is carried out at the time the amount of trapped PM in the particulate filter is smaller by a predetermined amount or more with respect to the PM regeneration threshold value, it becomes possible to avoid a situation in which the amount of trapped PM in the particulate filter becomes large to an excessive extent, or a situation in which the amount of PM oxidized in the particulate filter becomes large to an excessive extent. As a result, it becomes possible to suppress the rise of back pressure which may otherwise be induced due to the increase in the pressure loss of the particulate filter, or the excessive rise in the temperature of the particulate filter which may otherwise be induced due to the increase in the amount of oxidation of PM (the rate of oxidation of PM). The "predetermined amount" referred to herein is an amount at which even in cases where the amount of PM flowing into the particulate filter is increased due to the increase in the amount of EGR gas, it is considered to be able to avoid the rise of back pressure or the excessive rise in the temperature of the particulate filter, and is an amount which can be obtained in advance by adaptation processing making use of experiments, etc.

Here, note that when the temperature Tflt of the particulate filter is in a predetermined temperature range which is lower than the above-mentioned PM oxidation starting temperature Tpm, the PM trapped in the particulate filter is oxidized by reaction with nitrogen dioxide ($NO_2$) in the exhaust gas.

Figure 6:
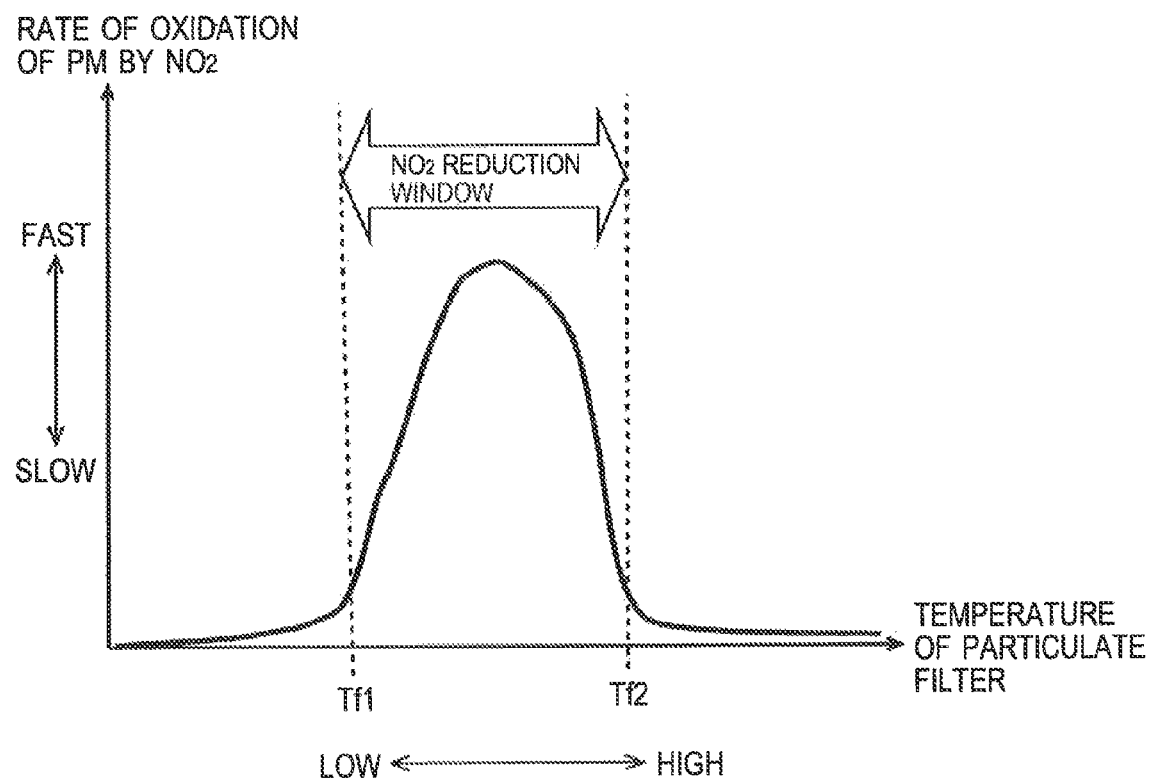
FIG. 6 is a view showing the relation between the temperature of the particulate filter and the rate of oxidation of PM by $NO_2$.

The relation between the temperature of the particulate filter and the rate of oxidation of PM by $NO_2$ is shown in FIG. 6. In FIG. 6, when the temperature of the particulate filter belongs to a temperature range ($NO_2$ reduction window) which is equal to or higher than a first filter temperature Tf1 and at the same time equal to or lower than a second filter temperature Tf2, the amount of PM being oxidized by reaction with the $NO_2$ in the exhaust gas (the rate of oxidation of PM) increases. Here, note that the temperature range specified by the first filter temperature Tf1 and the second filter temperature Tf2 is a temperature range of around about 350 degrees C., and can have been obtained experimentally in advance.

Accordingly, when the amount of $NO_2$ discharged from the internal combustion engine 1 is increased during the time when the temperature Tflt of the particulate filter belongs to the $NO_2$ reduction window, the amount of trapped PM in the particulate filter Σ the PM can be decreased. As a result, when the temperature Tflt of the particulate filter becomes equal to or higher than the PM oxidation starting temperature Tpm, the probability that the amount of trapped PM ΣPM in the particulate filter will be less than an upper limit amount A becomes high. In other words, when the temperature Tflt of the particulate filter becomes equal to or higher than the PM oxidation starting temperature Tpm, the NOx decreasing processing tends to be easily carried out.

As a method of increasing the amount of $NO_2$ discharged from the internal combustion engine 1, there can be used a method of decreasing the amount of EGR gas, a method of advancing the fuel injection timing (i.e., decreasing the amount of retardation thereof), etc. However, when the processing to decrease the amount of EGR gas or the processing to advance the fuel injection timing is carried out, the amount of nitric oxide (NO) discharged from the internal combustion engine 1 will also increase. Accordingly, it is desirable to carry out the processing for increasing the amount of $NO_2$ discharged from the internal combustion engine 1, on condition that the temperature Tscr of the SCR catalyst falls in the NOx reduction window.

Accordingly, by carrying out the processing to increase the amount of $NO_2$ on condition that the temperature Tscr of the SCR catalyst belongs to the NOx reduction window, the ECU 10 controls such that the amount of trapped PM ΣPM in the particulate filter is made to decrease, while suppressing the increase in the amount of NOx to be discharged into the atmosphere.

Figure 7:
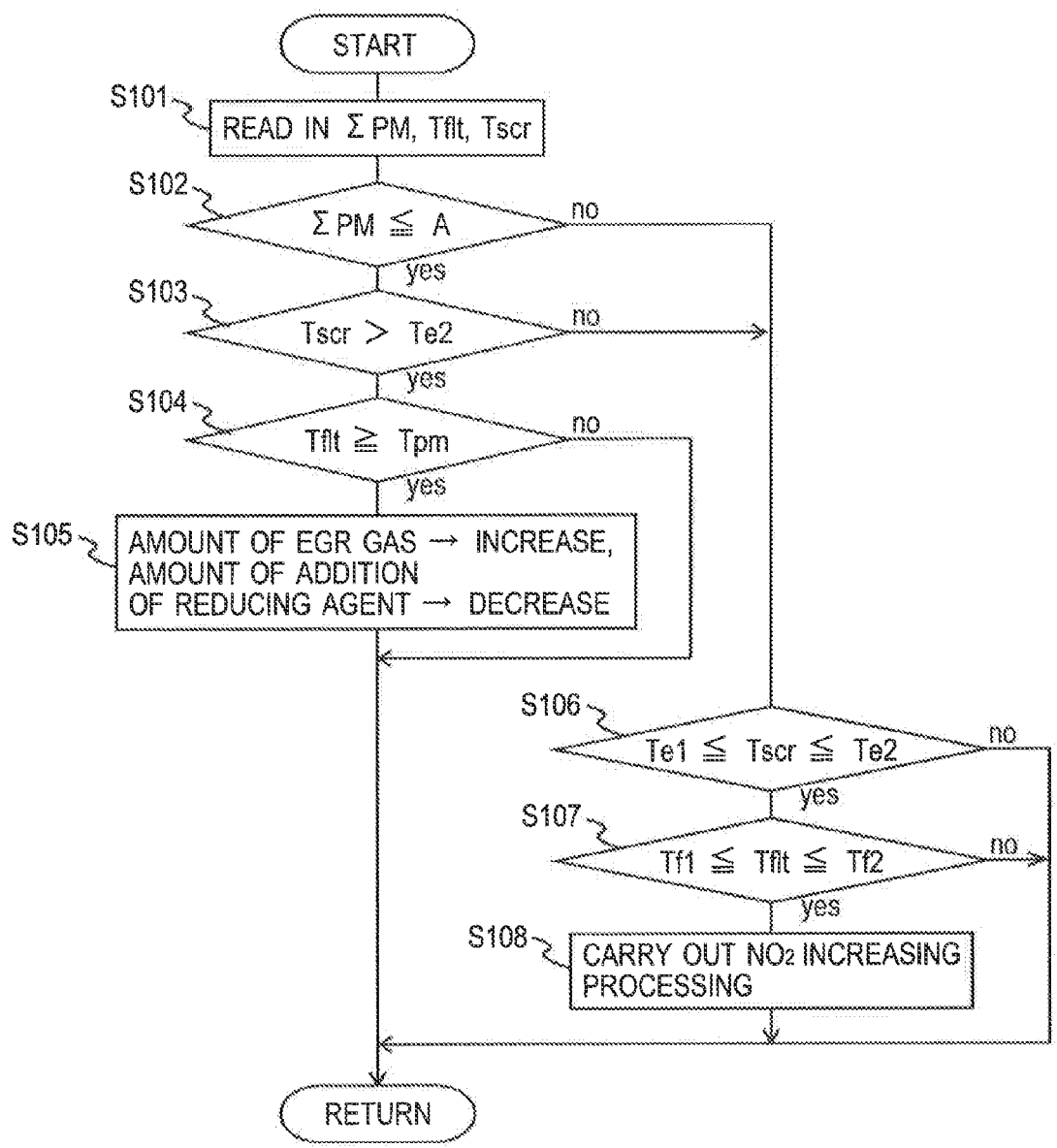
FIG. 7 is a flow chart showing a control routine which is executed by an ECU at the time when NOx decreasing processing is carried out in a first embodiment of the present invention.

In the following, an execution procedure of the NOx reduction processing in this embodiment will be described in line with FIG. 7. FIG. 7 is a flow chart which shows a control routine carried out by the ECU 10 at the time the NOx reduction processing is performed. The control routine in FIG. 7 is a routine which has been beforehand stored in a ROM of the ECU 10, and is a routine which is carried out by the ECU 10 in a periodic manner.

In the control routine of FIG. 7, in the processing of step S101, the ECU 10 reads in the temperature Tflt of the particulate filter, the temperature Tscr of the SCR catalyst, and the amount of trapped PM ΣPM in the particulate filter. As the temperature Tflt of the particulate filter, there can be used an output signal of the first exhaust gas temperature sensor 8. As the temperature Tscr of the SCR catalyst, there can be used an output signal of the second exhaust gas temperature sensor 9. Here, note that the temperature Tflt of the particulate filter or the temperature of the temperature Tscr of the SCR catalyst may be calculated by estimation using an operating state of the internal combustion engine 1 (the amount of fuel injection, the amount of intake air, etc.) as a parameter. The amount of trapped PM in the particulate filter can be obtained by means of a known method. For example, the amount of trapped PM may also be calculated by using, as a parameter, a differential pressure across the particulate filter (a measured value of an unillustrated differential pressure sensor), a flow rate of the exhaust gas (a measured value of the air flow meter 13), etc. In addition, the amount of trapped PM may also be calculated by using, as parameters, the temperature of the particulate filter, the engine operating state of the internal combustion engine 1 (the amount of intake air or the amount of fuel injection), and so on.

In the processing of step S102, the ECU 10 determines whether the amount of trapped PM ΣPM read in the above-mentioned step S101 is equal to or less than the upper limit amount A. The upper limit amount A is an amount which is obtained by subtracting a predetermined amount from the above-mentioned PM regeneration threshold value. In cases where an affirmative determination is made in the processing of step S102, the control routine of the ECU 10 (hereinafter simply referred to as the ECU 10) goes to the processing of step S103. On the other hand, in cases where a negative determination is made in the processing of step S102 (ΣPM>A), the ECU 10 once ends the execution of this routine. At that time, the ECU 10 may suppress the increase in the amount of generation of PM and the increase in the amount of generation of NOx, by retarding the fuel injection timing, as shown in the solid-line black circles in FIG. 3 and FIG. 4 mentioned above.

In the processing of step S103, the ECU 10 determines whether the temperature Tscr of the SCR catalyst read in the above-mentioned step S101 is higher than the upper limit value of the NOx reduction window (i.e., the second temperature Te2). In cases where an affirmative determination is made in the processing of step S103 (Tscr>Te2), the ECU 10 goes to the processing of step S104.

In the processing of step S104, the ECU 10 determines whether the temperature Tflt of the particulate filter read in the above-mentioned step S101 is equal to or higher than the PM oxidation starting temperature Tpm. In cases where an affirmative determination is made in the processing of step S104, the ECU 10 goes to the processing of step S105.

In the processing of step S105, the ECU 10 decreases the amount of NOx discharged from the internal combustion engine 1 by increasing the amount of EGR gas. Specifically, the ECU 10 controls the fuel injection valves 1a and the EGR valve 101 in such a manner that the fuel injection timing and the amount of EGR gas are made to match with those shown in the solid-line white circles in FIG. 3 and FIG. 4 mentioned above. In that case, the amount of generation of NOx can be decreased, while suppressing the increase in the amount of fuel consumption. In addition, in cases where the amount of EGR gas is increased, the amount of generation of PM increases, but the PM discharged from the internal combustion engine 1 is trapped by the particulate filter, thus making it possible to avoid the situation that the amount of PM discharged into the atmosphere increases. Moreover, because the temperature Tflt of the particulate filter is equal to or higher than the PM oxidation starting temperature Tpm, the increase in the amount of generation of PM is offset by the amount of the PM to be oxidized in the particulate filter. As a result, it is possible to suppress the increase in the amount of NOx, while suppressing the increase in the frequency of execution of the PM regeneration processing. Further, because the amount of EGR gas is increased on condition that the amount of trapped PM ΣPM is equal to or less than the upper limit amount A, it becomes possible to carry out the NOx decreasing processing, while avoiding the situation in which the amount of trapped PM in the particulate filter may become large to an excessive extent, or the amount of PM oxidized in the particulate filter may become large to an excessive extent. As a result, it is also possible to suppress the rise of back pressure which may otherwise be induced due to the increase in the pressure loss of the particulate filter, or the excessive rise in the temperature of the particulate filter which may otherwise be induced due to the increase in the amount of oxidation of PM (the rate of oxidation of PM).

However, when the temperature Tscr of the SCR catalyst is higher than the upper limit value of the NOx reduction window (the second temperature Te2), the amount of NH$_3$, which can be adsorbed by the SCR catalyst, becomes small. For that reason, when the same amount of the reducing agent as that at the time of the temperature Tscr of the SCR catalyst belonging to the NOx reduction window (Te1≤Tscr≤Te2) is supplied from the reducing agent addition valve 7, there will be a possibility that the amount of NH$_3$ not adsorbed to the SCR catalyst (the amount of NH$_3$ slip) may increase.

Accordingly, the ECU 10 controls such that at the time of increasing the amount of EGR gas in the above-mentioned processing of step S104, the amount of the reducing agent to be supplied from the reducing agent addition valve 7 is made to decrease. In that case, the amount of NH$_3$ to be supplied to the SCR catalyst is decreased, thus making it possible to avoid the situation in which the amount of NH$_3$ not adsorbed to the SCR catalyst increases. However, it is also assumed that when the amount of the reducing agent to be supplied from the reducing agent addition valve 7 is decreased, the rate of NOx reduction in the SCR catalyst drops or becomes low. But, the amount of NOx discharged from the internal combustion engine 1 is made small by the increase in the amount of EGR gas, thus making it possible to suppress the increase in the amount of NOx to be discharged into the atmosphere without being reduced by the SCR catalyst.

Accordingly, it is also possible to suppress the increase in the amount of NH$_3$ slip, while suppressing the increase in the amount of NOx to be discharged into the atmosphere.

In cases where a negative determination is made in the above-mentioned processing of step S102 (ΣPM>A), or in cases where a negative determination is made in the above-mentioned processing of step S103 (Tscr≤Te2), the ECU 10 goes to the processing of step S106. In the processing of step S106, the ECU 10 determines whether the temperature Tscr of the SCR catalyst read in the above-mentioned step S101 belongs to the NOx reduction window. That is, the ECU 10 determines whether the temperature Tscr of the SCR catalyst belongs to the range which is equal to or higher than the above-mentioned first temperature Te1 and at the same time is equal to or lower than the above-mentioned second temperature Te2. In cases where a negative determination is made in the processing of step S106 (Tscr<Te1, or Tscr>Te2), the ECU 10 once ends the execution of this routine. On the other hand, in cases where an affirmative determination is made in the processing of step S106 (Te1≤Tscr≤Te2), the ECU 10 goes to the processing of step S107.

In the processing of step S107, the ECU 10 determines whether the temperature Tflt of the particulate filter read in the above-mentioned processing of step S101 belongs to a temperature range (i.e., the NO$_2$ reduction window) which is equal to or higher than the first filter temperature Tf1 and at the same time is equal to or lower than the second filter temperature Tf2. In cases where a negative determination is made in the processing of step S106 (Tflt<Tf1, or Tflt>Tf2), the ECU 10 once ends the execution of this routine. On the other hand, in cases where an affirmative determination is made in the processing of step S107 (Tf1≤Tflt≤Tf2), the ECU 10 goes to the processing of step S108.

In the processing of step S108, the ECU 10 carries out the processing to increase the amount of NO$_2$ discharged from the internal combustion engine 1 (i.e., NO$_2$ increasing processing). Specifically, the ECU 10 decreases the amount of EGR gas, or advances the fuel injection timing. When the NO$_2$ increasing processing is carried out according to such a procedure, it becomes possible to decrease the amount of trapped PM ΣPM in the particulate filter, while suppressing the increase in the amount of NOx to be discharged into the atmosphere. As a result, when the temperature of the particulate filter becomes equal to or higher than the PM oxidation starting temperature Tpm, the probability that the amount of trapped PM ΣPM in the particulate filter will be equal to or less than the upper limit amount A becomes high. Accordingly, when the temperature of the particulate filter becomes equal to or higher than the PM oxidation starting temperature Tpm, it is possible to increase the probability (frequency) that the NOx decreasing processing due to the increase in the amount of EGR gas is carried out.

In addition, in cases where a negative determination is made in the above-mentioned processing of step S104 (Tflt<Tpm), the ECU 10 ends the execution of this routine, without carrying out the NOx decreasing processing due to the increase in the amount of EGR gas. At that time, the ECU 10 may decrease the amount of generation of NOx, by retarding the fuel injection timing, as shown in the solid-line black circles in FIG. 3 and FIG. 4 mentioned above.

As described above, a control means according to the present invention is achieved by means of the ECU 10 carrying out the control routine of FIG. 7. As a result, when the temperature of the SCR catalyst exceeds the upper limit value of the NOx reduction window, it is possible to suppress the increase in the amounts of NOx and PM to be discharged into the atmosphere, while suppressing the increase in the amount of fuel consumption ($CO_2$) and the increase in the amount of $NH_3$ slip.

<Embodiment 2>

Figure 8:
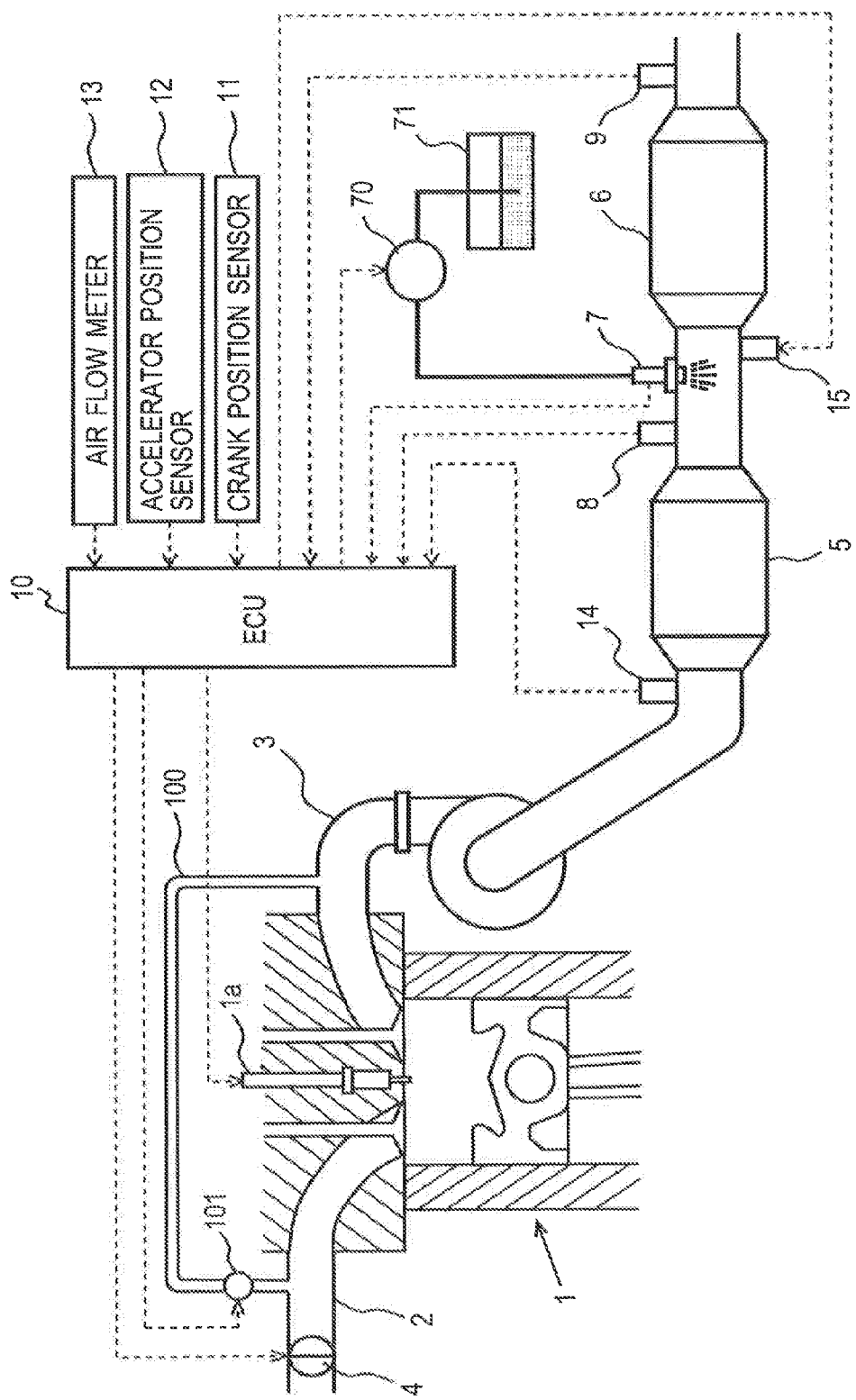
FIG. 8 is a view showing the schematic construction of an internal combustion engine and its intake and exhaust systems in a second embodiment of the present invention.

Reference will be made to a second embodiment of the present invention based on FIG. 8 and FIG. 9. FIG. 8 is a view showing another construction example of an internal combustion engine and its intake and exhaust systems to which the present invention is applied. In FIG. 8, the same symbols are attached to the same components as those in the above-mentioned first embodiment.

In FIG. 8, in the exhaust passage 3 at a location between the first catalyst casing 5 and the second catalyst casing 6, there is arranged a secondary air supply device 15 which serves to supply air (secondary air) into the exhaust passage 3. The secondary air supply device 15 is controlled by means of the ECU 10. Specifically, when the temperature of the SCR catalyst is higher than the upper limit value of the NOx reduction window, and when the temperature of the particulate filter is less than the PM oxidation starting temperature, the ECU 10 controls such that secondary air is made to be supplied to the exhaust passage 3 from the secondary air supply device 15. In that case, the exhaust gas flowing into the SCR catalyst is cooled by the secondary air of low temperature, in accordance with which the SCR catalyst is also cooled. As a result, in cases where the NOx decreasing processing due to the increase in the amount of EGR gas can not be carried out, in spite of the fact that the temperature of the SCR catalyst is higher than the upper limit value of the NOx reduction window, the temperature of the SCR catalyst can be quickly decreased to a value equal to or less than the above-mentioned upper limit value. Accordingly, when the NOx decreasing processing can not be carried out, the increase in the amount of NOx to be discharged into the atmosphere can be suppressed as small as possible.

Figure 9:
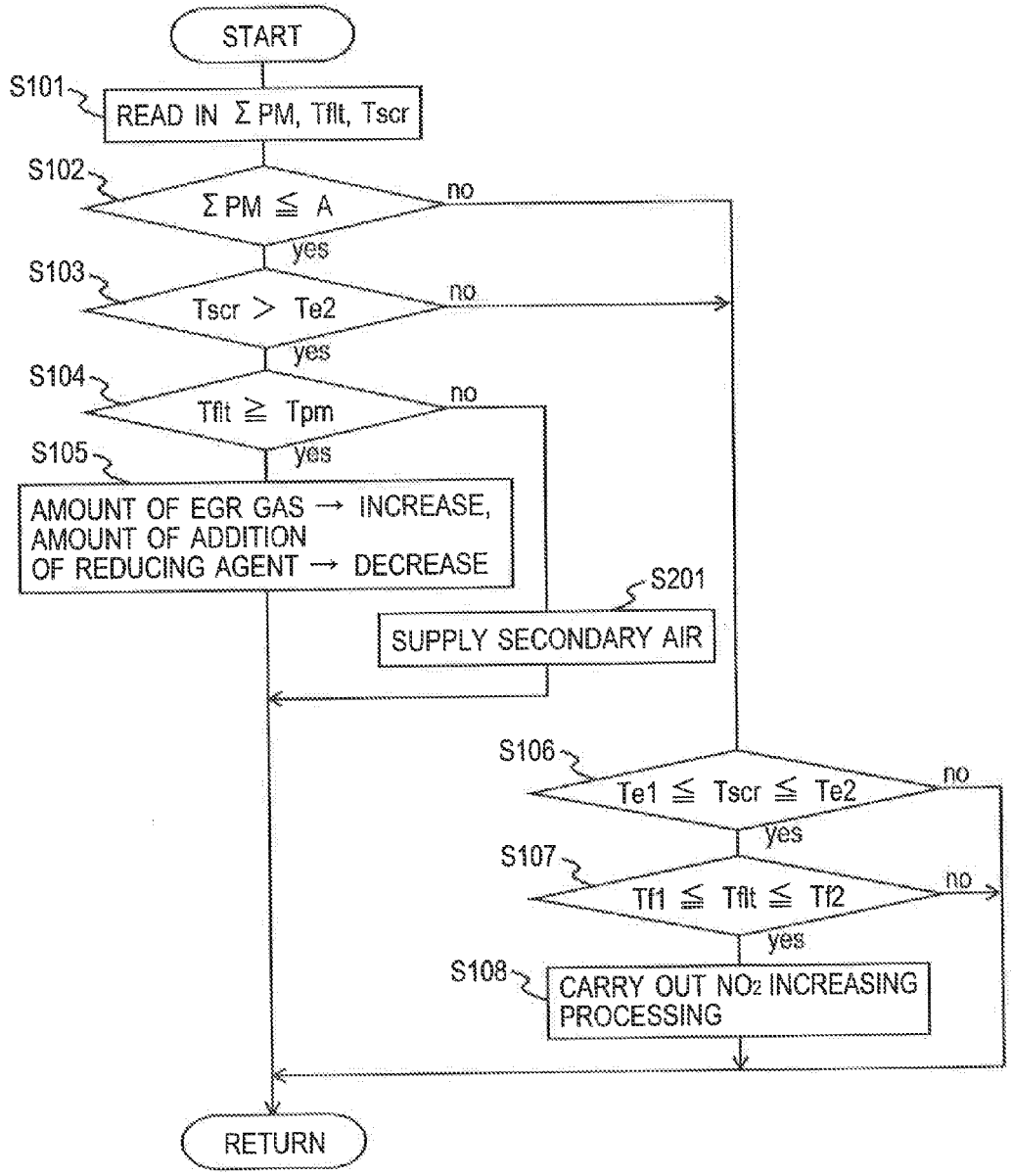
FIG. 9 is a flow chart showing a control routine which is executed by an ECU at the time when NOx decreasing processing is carried out in the second embodiment of the present invention.

FIG. 9 is a flow chart which shows a control routine carried out by the ECU 10 at the time the NOx reduction processing is performed. In FIG. 9, the same symbols are attached to the same processes as those in the above-mentioned control routine of the first embodiment (see FIG. 7). The difference of the control routine in FIG. 9 from the above-mentioned control routine in FIG. 7 is that in cases where a negative determination is made in the processing of step S104 (Tflt<Tpm), the processing of step S201 is carried out. In the processing of step S201, the ECU 10 controls such that the secondary air is made to be supplied to the exhaust passage 3 from the secondary air supply device 15. In that case, under the condition that the NOx decreasing processing can not be carried out, it is possible to shorten a period of time in which the temperature Tscr of the SCR catalyst becomes higher than the upper limit value (i.e., the second temperature Te2).

Here, note that the supply of the secondary air may be carried out, when the temperature Tscr of the SCR catalyst becomes close to the above-mentioned upper limit value (the second temperature Te2). In that case, it becomes difficult for the temperature Tscr of the SCR catalyst to exceed the above-mentioned upper limit value (the second temperature Te2).

In the above-mentioned first and second embodiments, there has been described an example in which the amount of EGR gas is increased, on the conditions that: the amount of trapped PM ΣPM is equal to or less than the upper limit amount A; the temperature Tflt of the particulate filter is equal to or higher than the PM oxidation starting temperature Tpm; and the temperature Tscr of the SCR catalyst is higher than the upper limit value of the NOx reduction window (i.e., the second temperature Te2). However, the condition that the temperature Tscr of the SCR catalyst is higher than the upper limit value of the NOx reduction window (the second temperature Te2) is not necessarily a requisite or essential condition. That is, the amount of EGR gas may be increased on the conditions that: the amount of trapped PM ΣPM is equal to or less than the upper limit amount A; and the temperature Tflt of the particulate filter is equal to or higher than the PM oxidation starting temperature Tpm.

When the amount of EGR gas is increased on condition that the amount of trapped PM ΣPM is equal to or less than the upper limit amount A, and that the temperature Tflt of the particulate filter is equal to or higher than the PM oxidation starting temperature Tpm, the amount of NOx flowing into the SCR catalyst will become small. As a result, the amount of the reducing agent, which is required in order for the SCR catalyst to reduce NOx, becomes small. Accordingly, it is possible to suppress the increase in the amount of NOx to be discharged into the atmosphere, while making small the amount of the reducing agent to be supplied to the SCR catalyst.

EXPLANATION OF REFERENCE NUMERALS AND CHARACTERS 1 internal combustion engine
1a fuel injection valves
2 intake passage
3 exhaust passage
4 throttle valve
5 first catalyst casing
6 second catalyst casing
7 reducing agent addition valve
8 first exhaust gas temperature sensor
9 second exhaust gas temperature sensor
10 ECU
11 crank position sensor
12 accelerator position sensor
13 air flow meter
14 NF sensor
15 secondary air supply device
70 pump
71 reducing agent tank
100 EGR passage
101 EGR valve

The invention claimed is:

1. An exhaust gas purification system for an internal combustion engine comprising:
a particulate filter arranged in an exhaust passage of an internal combustion engine,
a selective catalytic reduction catalyst that is arranged in a portion of the exhaust passage at the downstream side of said particulate filter;
a reducing agent supply device that supplies a reducing agent, which is ammonia or a precursor of ammonia, to a portion of the exhaust passage at the upstream side of said selective catalytic reduction catalyst; and
an EGR device that supplies a part of exhaust gas flowing through the exhaust passage to an intake passage as an EGR gas;
a first temperature detection unit that detects a temperature which is correlated with the temperature of said particulate filter;

a second temperature detection unit that detects a temperature which is correlated with the temperature of said selective catalytic reduction catalyst;

a detection unit that detects an amount of trapped PM which is an amount of PM trapped in said particulate filter; and a control unit that controls the EGR device so as to increase the amount of EGR gas, when a detected value of said first temperature detection unit is equal to or higher than the lowest temperature at which particulate matter can be oxidized, and when the amount of trapped PM detected by said detection unit is smaller by a predetermined amount or more, with respect to the amount of trapped PM which becomes an execution condition of PM regeneration processing, and carries out NOx increasing processing which is processing to increase NOx discharged from the internal combustion engine, when the detected value of said first temperature detection unit belongs to a temperature range which is lower than the lowest temperature at which particulate matter can be oxidized, and in which an oxidation reduction reaction between the particulate matter trapped in the particulate filter and nitrogen dioxide which is a part of NOx contained in the exhaust gas is promoted, and when a detected value of the second temperature detection unit belongs to an NOx reduction window.

2. The exhaust gas purification system for an internal combustion engine in claim 1, wherein when the detected value of said first temperature detection unit is equal to or higher than the lowest temperature at which particulate matter can be oxidized, and when the amount of trapped PM detected by said detection unit is smaller by the predetermined amount or more with respect to the amount of trapped PM which becomes an execution condition of PM regeneration processing, said control unit controls said EGR device so as to increase the amount of EGR gas, on condition that the detected value of said second temperature detection unit is equal to or more than an upper limit value of said NOx reduction window.

3. The exhaust gas purification system for an internal combustion engine in claim 2, wherein said control unit decreases the amount of the reducing agent supplied from said reducing agent supply device in a period of time in which said EGR device is controlled so as to increase the amount of EGR gas.

4. The exhaust gas purification system for an internal combustion engine in claim 3, wherein said NOx increasing processing is processing to control said EGR device so as to decrease the amount of EGR gas.

5. The exhaust gas purification system for an internal combustion engine in claim 3, wherein said internal combustion engine is an internal combustion engine of compression ignition type which is equipped with a fuel injection valve for injecting fuel into a cylinder; and said NOx increasing processing is processing to advance fuel injection timing of said fuel injection valve.

6. The exhaust gas purification system for an internal combustion engine in claim 2, wherein said NOx increasing processing is processing to control said EGR device so as to decrease the amount of EGR gas.

7. The exhaust gas purification system for an internal combustion engine in claim 2, wherein said internal combustion engine is an internal combustion engine of compression ignition type which is equipped with a fuel injection valve for injecting fuel into a cylinder; and said NOx increasing processing is processing to advance fuel injection timing of said fuel injection valve.

8. The exhaust gas purification system for an internal combustion engine in claim 1, wherein said NOx increasing processing is processing to control said EGR device so as to decrease the amount of EGR gas.

9. The exhaust gas purification system for an internal combustion engine in claim 1, wherein said internal combustion engine is an internal combustion engine of compression ignition type which is equipped with a fuel injection valve for injecting fuel into a cylinder; and said NOx increasing processing is processing to advance fuel injection timing of said fuel injection valve.

* * * * *